No. 677,039. Patented June 25, 1901.
P. J. MORAN.
NUT LOCK.
(Application filed Dec. 29, 1900.)
(No Model.)
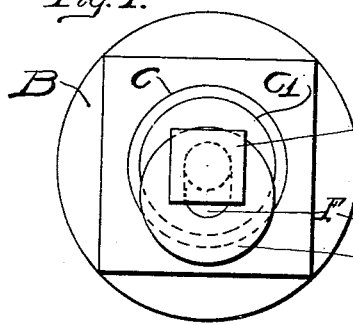
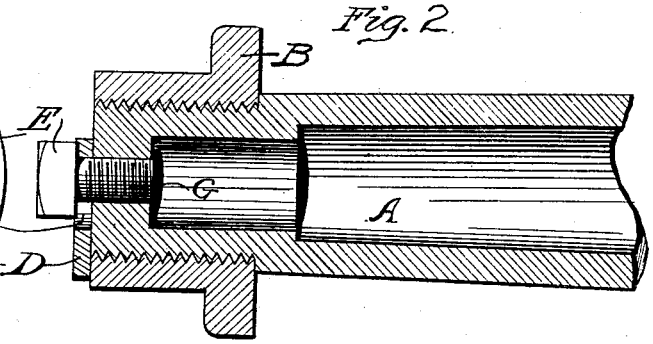
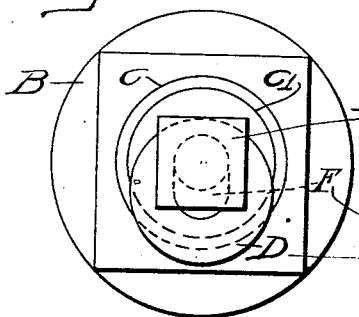
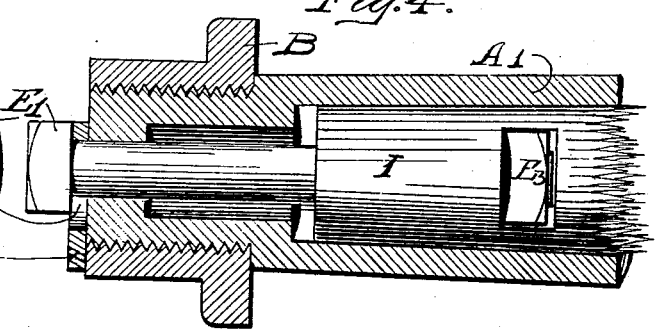
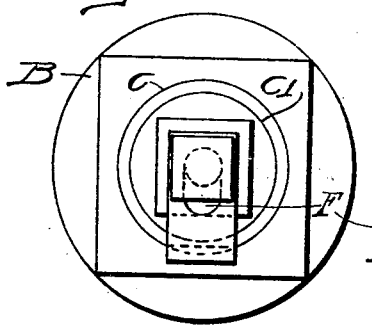
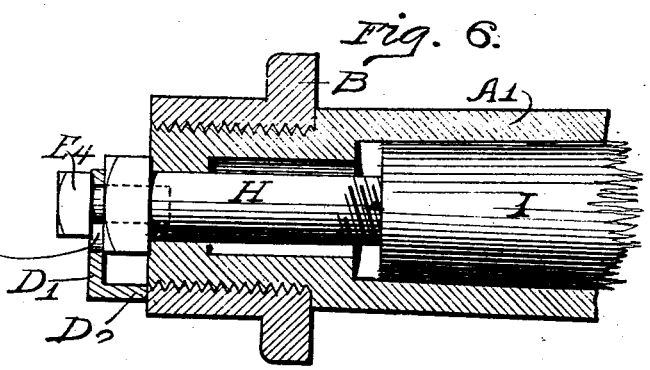
Witnesses
J. M. Heiskell
J. B. Heiskell
Inventor:
Patrick J. Moran
by J. Heiskell Weatherford
his attorney.
THE NORRIS PETERS CO., PHOTO-LITHO., WASHINGTON, D. C.

UNITED STATES PATENT OFFICE.

PATRICK J. MORAN, OF MEMPHIS, TENNESSEE.

NUT-LOCK.

SPECIFICATION forming part of Letters Patent No. 677,039, dated June 25, 1901.

Application filed December 29, 1900. Serial No. 41,489. (No model.)

*To all whom it may concern:*

Be it known that I, PATRICK J. MORAN, a citizen of the United States, residing at Memphis, Shelby county, State of Tennessee, have invented certain new and useful Improvements in Nut-Locks, of which the following is a specification.

My invention relates to an improvement in nut-locks, and especially to a lock for wagon-nuts, to which class of lock I will confine my description in this specification and drawings.

The object of my invention is to provide a simple and effective lock which is durable, which may be easily applied by any one with a limited supply of tools, and which will not have to be removed in order to remove the nut.

My invention consists in combining with the nut a locking piece or washer adapted to bind against the outer face of the nut when same is in place, said washer being smaller than the interior of the nut and adapted to pass through same to permit the nut to be removed or replaced without removing said washer, all of which will be more fully set out in the drawings, specification, and claims.

In the drawings, Figure 1 is an end elevation, and Fig. 2 a longitudinal section, of a wagon-axle with open nut, showing locking-washer in position to bind nut. Figs. 3 and 4 are end elevation and longitudinal section, respectively, of a modification, showing a form of thimble-skein axle with identical locking-washer. Figs. 5 and 6 are end elevation and longitudinal section, respectively, of a thimble-skein axle, showing modification of form of locking-washer.

Referring now to the drawings, in which like parts are indicated by the same or like letters in all the views, A represents the skein end of a hollow wagon-axle with the usual open nut B thereon.

C and C' show the outer and inner edges, respectively, of the thread, and D the locking-washer. This washer is preferably circular in form and must positively be of less diameter than the inner edge C' of the thread on the nut B, so that the said nut B may be removed by bringing the locking-washer D to a position concentric with it. To permit this change of position of the locking-washer D, I cut a slot F in it, which slot starts with a hole in the center of the washer and extends toward one side, as shown in the drawings. It is thus possible to first put on the locking-washer D, which for convenience I have shown held by the head of a cap-screw E, tapped into the center of the wagon-axle at G, and by bringing it to the center to slip the nut on over it and screw it in place. The locking-washer D is then allowed to drop into the position shown in the drawings, when it will be seen that the nut is effectually held from coming off. I have shown a cap-screw in Figs. 1 and 2 as holding the locking-washer D on, although it is entirely possible to use a rivet for this purpose, my reason for this being that the screw may be tightened to keep the locking-piece from rattling and loosened to permit the easy movement when such movement is desirable.

In Figs. 3 and 4 I show my lock as applied to a thimble-skein A', which skein is held on the axle I by a machine-bolt E', with nut $E^3$, which bolt also serves to hold the locking-piece D (as did the cap-screw in the preceding case) and which may be loosened or tightened as the cap-screw was.

In Figs. 5 and 6, D' is a modification of the form of the locking-piece. In these figures the thimble-skein A' is held in place by the ordinary lag-screw H, and as it may not be thought best to loosen this in order to put on the locking-washer I have shown this piece D' as put on outside the head of the lag-screw and have bent one end $D^2$ of it inward, so that it will bind against the nut B when it drops in place. While I have shown the washer D' as rectangular in shape, it is of such size that it will readily pass through the nut B when it is brought to the center, which is possible, since it has a slot F identical with that shown in the forms D.

Various modifications of the locking-washer are possible without changing in any way the spirit of my invention. The holding-screw E may be set eccentrically, and a hole eccentrically located in the locking-washer D may be used instead of the slot F. The locking-washer D can be made of spring material and slightly cupped, so that it will not be necessary to loosen the cap-screw to move the washer, and at the same time the locking-washer will be tight enough to prevent rattling. In this case I prefer to use a rivet instead of the cap-screw E.

To put on the lock, it is only necessary to tap a hole in the end of the axle or lag-screw and fasten the locking-washer D in place by means of the cap-screw E. The locking-washer will drop to place by gravity and will be against the nut at its lowest point. The cap-screw E can then be tightened against it to prevent rattling. To remove the nut, loosen the cap-screw E, slip the washer to the center, hold it with one hand or tighten the cap-screw to hold it, and unscrew the nut. After replacing the nut the washer is dropped and the cap-screw tightened.

The cap-screw used with this washer may have threads in the same or opposite direction from those of the nut, since if in the same direction and standard the difference in pitch will make an effectual lock.

Having thus fully described my invention, what I claim, and desire to secure by Letters Patent of the United States, is—

1. As a nut-lock, the combination with a bolt and nut, of a locking-washer movably secured to the end of the bolt, said locking-washer being of slightly-less exterior diameter than the interior diameter of the nut, whereby it is adapted to allow the removal of the nut, without being itself removed, and having a slot extending outward from the central hole of said washer whereby it may be displaced and engage the outer face of the nut, all substantially as shown and described.

2. As a nut-lock, the combination with a bolt and nut thereon, the face of said nut coming flush with the end of the said bolt, of a retaining-washer of slightly-less exterior diameter than the interior diameter of said nut, said washer having a central hole and a slotted hole extending therefrom so that it may be brought concentric with the nut, to allow same to be removed and replaced over it and so that when the nut is replaced the said washer may be displaced to engage the outer face of the nut, and a screw to hold the said washer in place, the said screw being loosened to permit displacement of the washer and tightened to hold same and prevent rattling, all substantially as shown and described.

3. As a wagon-nut lock, the combination with the threaded axle end and the nut, of a washer movably secured thereto, said washer being of slightly-less diameter than the interior diameter of the nut and being slotted outward from the center, so that it may be brought concentric with the nut to allow same to be removed and replaced over it and so that when the nut is replaced, the said washer may be displaced to engage the outer face of said nut and prevent its removal.

4. As a wagon-nut lock, the combination with the threaded axle end and the nut, of a washer movably secured thereto, said washer being of slightly-less diameter than the interior diameter of the nut and being slotted outward from the center, so that it may be brought concentric with the nut to allow same to be removed and replaced over it and so that when the nut is replaced the said washer may be displaced to engage the outer face of said nut and prevent its removal, and means of tightening and loosening said washer, substantially as shown and described.

5. As a wagon-nut lock, the combination with the threaded axle end and the nut thereon, of a locking piece or washer movably secured thereto, and means of loosening said washer to permit its displacement, and of tightening it to hold it, said washer being of such size that it will pass through the nut and being slotted so that it may be brought to a position in which the nut may be removed and replaced, and so that said washer may be shifted to bring a portion thereof into engagement with the face of the nut to prevent its removal, all substantially as shown and described.

6. As a wagon-nut lock, the combination with the threaded axle end and the nut thereon, of a locking piece or washer and a cap-screw to secure said washer, said cap-screw by loosening permitting the displacement of said washer and by tightening holding said washer and preventing its rattling; said washer being of such size that it will pass through the nut and being slotted so that it may be brought to a position in which the nut may be removed and replaced and so that said washer may be shifted to bring a portion thereof into engagement with the face of the nut to prevent its removal all substantially as shown and described.

7. As a wagon-nut lock for a thimble-skein axle, the combination with the threaded axle-skein, the lag-screw for holding the same in place and the nut thereon, of a locking piece or washer having one end bent inward and a cap-screw to secure said washer, said cap-screw by loosening, permitting the displacement of said washer, and by tightening, holding said washer and preventing its rattling, said washer being of such size that it will pass through the nut and being slotted so that it may be brought to a position in which the nut may be removed and replaced, and so that said washer may be shifted to bring the bent portion thereof into engagement with the face of the nut to prevent its removal, all substantially as shown and described.

In testimony whereof I have signed my name to this specification in the presence of two subscribing witnesses.

PATRICK J. MORAN.

Witnesses:
C. W. HEISKELL,
GEO. E. NEUHARDT.